United States Patent
Kim et al.

(10) Patent No.: US 6,843,122 B2
(45) Date of Patent: Jan. 18, 2005

(54) MASS FLOW CONTROLLER FOR CONTROL PURGE AND MANAGING METHOD OF THE SAME

(75) Inventors: Hae-Lyong Kim, Kyungki-do (KR); Tae-Ho Lee, Kyungki-do (KR)

(73) Assignee: Taesan LCD. Co., Ltd., Pyungtaek (KR)

( * ) Notice: Subject to any disclaimer, the term of this patent is extended or adjusted under 35 U.S.C. 154(b) by 9 days.

(21) Appl. No.: 10/431,129

(22) Filed: May 7, 2003

(65) Prior Publication Data

US 2004/0123657 A1 Jul. 1, 2004

(30) Foreign Application Priority Data

Dec. 27, 2002 (KR) ................................. 10-2002-0084877

(51) Int. Cl.[7] ............................. G01F 1/68; G06F 19/00
(52) U.S. Cl. ....................... 73/202.5; 73/204.21; 702/45
(58) Field of Search ............................... 73/202, 202.5, 73/204.21; 702/45

(56) References Cited

U.S. PATENT DOCUMENTS 4,369,031 A * 1/1983 Goldman et al. ........... 432/198

* cited by examiner

Primary Examiner—Harshad Patel
(74) Attorney, Agent, or Firm—Ladas & Parry LLP (57) ABSTRACT

The present invention relates to a mass flow controller for a control purge and a managing method of the same. When a user sets the mode to a control purge mode capable of controlling a maximum flowing amount for constantly maintaining a maximum flowing amount when performing a purge function after the user sets a purge function mode based on a purpose of use of a mass flow controller, a control circuit compares a set value of a flowing amount inputted based on a user's selection with a previously set threshold value and controls a valve for constantly maintaining a maximum flowing amount by switching to a gain resistor for a purge mode having a gain value capable of performing a purge function and controls a valve for thereby accurately controlling a small flowing amount by switching to a gain resistor for a common control mode having a gain value capable of performing a common control function. When a user sets the mode to a purge function mode based on a state of use of a mass flow controller, fully opens a valve and sets a valve open purge mode for obtaining a maximum flowing amount, a control circuit compares a set value of a flowing amount inputted by a user with a previously set threshold value and controls a valve for fully opening a valve for thereby implementing a maximum flowing amount and accurately controlling a small flowing amount.

11 Claims, 5 Drawing Sheets

MASS FLOW CONTROLLER FOR CONTROL PURGE AND MANAGING METHOD OF THE SAME

BACKGROUND OF THE INVENTION

1. Field of the Invention

The present invention relates to a mass flow controller and a managing method of the same, and in particular to a mass flow controller for a control purge and a managing method of the same which are capable of implementing two functions of a common control function and purge function by one mass flow controller by automatically adjusting a gain proper to a small flowing amount and large flowing amount based on a set value of a gas flow inputted by a worker.

2. Description of the Background Art

Generally, a mass flow controller is directed to accurately and correctly adjusting the flowing amounts of various gases used for a fabrication of a semiconductor.

At this time, almost mass flow controllers adapt a sensor of a thermal conduction(thermal transfer method) which has the advantages that it is possible to directly measure a flowing amount of gas without changing a pressure or temperature, a high level electric output is possible, a small variation in gas flow is well detected based on its high sensitivity, and it has a small pressure loss and is well adapted to a wider pressure range.

Figure 1:
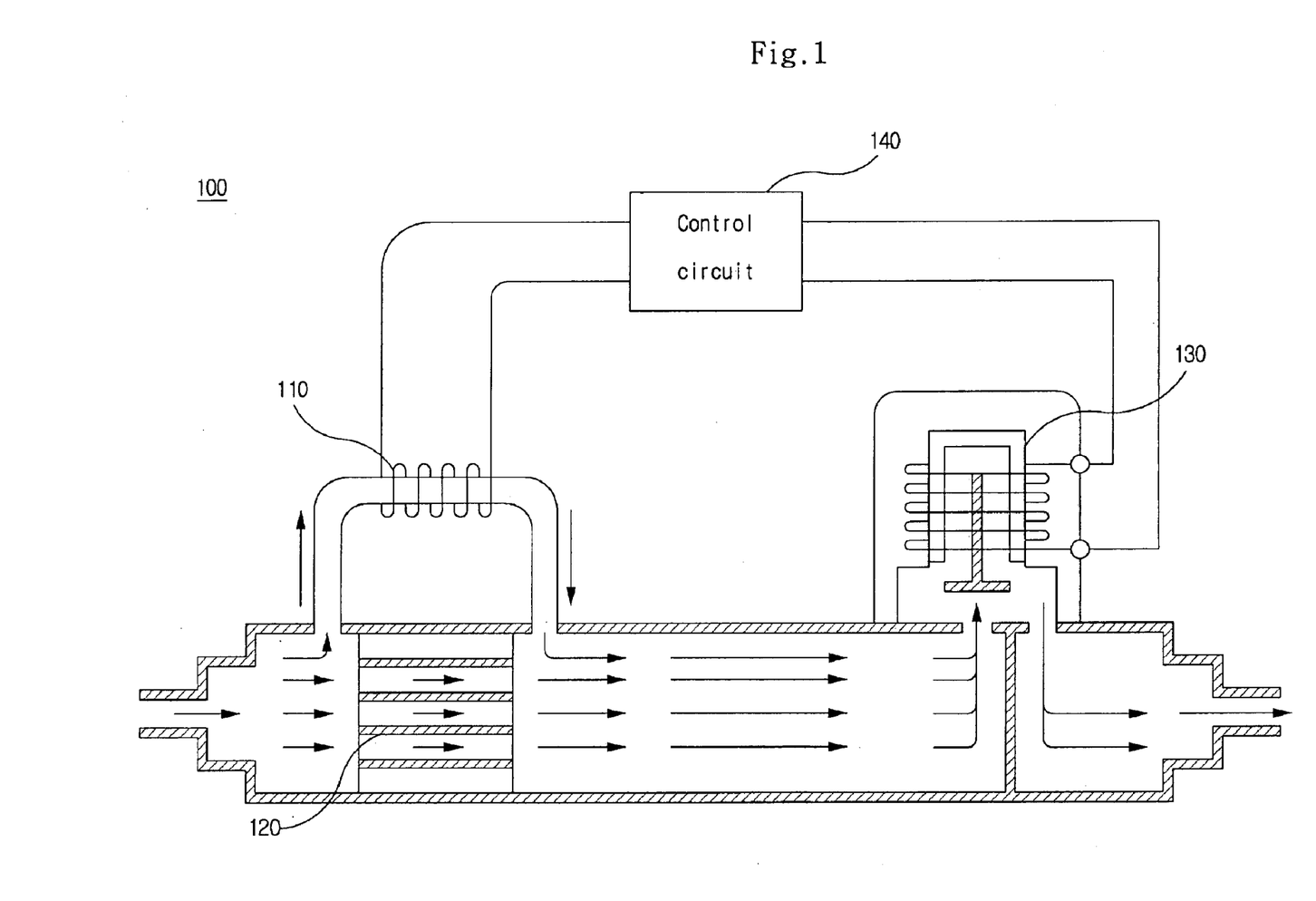
FIG. 1 is a view illustrating the construction of a conventional mass flow controller.

FIG. 1 is a view illustrating a schematic construction of a conventional mass flow controller.

As shown therein, a mass flow controller 100 includes a thermal conduction type sensor 110, a bypass 120, a valve 130 and a control circuit 140.

The sensor 110 is implemented in such a manner that a detection coil is wound on a tube formed of a metallic material, etc. When a voltage is applied, the sensor is heated by a thermal sensitive resistance and detects a temperature difference occurring at both sides of a detection coil based on a flow of gas for thereby outputting the detected value to the control circuit 140.

The bypass 120 is adapted to flow a part of gas inputted from the outside to a tube in which the sensor 110 is installed and performs a function for dividing the flow of gas through a certain line which is separately connected in parallel with the sensor 110 and adjusting the ratio of the main flow line and the divided sensor flow line.

The valve 130 adjusts a flowing amount of gas in accordance with a control of a control circuit 140 which measures and controls an actual mass flow of gas flowing through the mass flow controller 100 based on the value of the temperature difference by a gas flow inputted from the sensor 110.

The control circuit 140 compares a set value inputted by a user with a value of the temperature difference based on a gas flow inputted from the thermal detection sensor 110 and controls the valve 130 for decreasing or increasing the flowing amount of gas based on a result of the comparison between the set value and the current mass flowing amount.

The operation of the mass flow controller 100 will be described. When a certain gas used for a fabrication of a semiconductor is inputted into the mass flow controller 100, the gas flow is divided before the gas is inputted into the bypass 120 and directly flows through the sensor 110. The sensor 110 detects a temperature variation between both sides of the detection coil based on the flow of a gas flowing through the tube and outputs a value of the temperature difference to the control circuit 140.

The control circuit 140 detects the current flowing amount of mass based on a value of the temperature difference inputted from the sensor 110 and compares the set value inputted by a user and a detected mass and controls the opening and closing operations of the valve 130.

Namely, in the case that the detected mass flowing amount is smaller than the set value inputted by the user, the valve 130 is more opened, and in the case that the detected mass flowing amount is larger than the set value inputted by the user, the valve 130 is closed. Therefore, the flow of the gas inputted through the bypass 120 is adjusted, so that a desired gas amount is outputted.

For example, in the case that the above described mass flow controller is used for a semiconductor etching process, two mass flow controllers, namely, a mass flow controller capable of accurately controlling the flowing amount of gas and a mass flow controller capable of performing a purge function(function for flowing a large flowing amount by opening a valve for a cleaning operation, etc.), are concurrently performed.

However, when the above mass flow controller is used for a semiconductor etching process, etc., since the common mass flow controller and purge mass flow controller must be concurrently used, there is an inconvenience for constructing the mass flow controller proper for each purpose. Therefore, the cost for the constructions of the equipment is high.

SUMMARY OF THE INVENTION

Accordingly, it is an object of the present invention to provide a mass flow controller for a control purge and a managing method of the same which are capable of concurrently implementing two functions of a common control function and purge control function using one mass flow controller by automatically adjusting a gain proper to a small flowing amount which is for a common control purpose and a large flowing amount which is for a purge function based on a set value of a flowing amount of gas inputted by a worker.

It is another object of the present invention to provide a mass flow controller for a control purge and a managing method of the same which are capable of adjusting a gain to be proper for a large flowing amount by judging it as a purge purpose in the case that a set value of a flowing amount inputted by a user is above a previously set threshold value and adjusting a gain to be proper for a small flowing amount by judging it as a common control purpose in the case that a set value of the flowing amount inputted by a user is lower than a previously set threshold value.

To achieve the above objects, in a mass flow controller which is capable of accurately controlling and correctly various gases used for a fabrication of a semiconductor to flow by a desired amount, there is provided a mass flow controller for a control purge which includes a sensor which is adapted to detect a temperature variation at both sides of a detection coil based on a flow of a gas flowing through a tube and to output a value of a temperature difference to a control circuit, a bypass which is adapted to flow a part of gas inputted from the outside to a tube in which a sensor is installed and to divide and output a flow of gas, a valve which is adapted to adjust and output a flowing amount of gas inputted through the bypass based on a gain adjustment for a common control or a gain adjustment for a purge function of the control circuit, and a control circuit which is adapted to switch to a resistor having a gain value capable of performing a purge function by judging that the mode corresponds to a purge mode when a set value of a flowing amount inputted by a user who uses a mass flow controller in a state that a purge function mode is set, and to switch to a resistor having a gain value capable of performing a common control function by judging the mode corresponds to a common control mode when a set value of a flowing amount inputted by a user is below a threshold value, and to compute the current mass flowing amount based on a value of a temperature difference based on a gas flow inputted from the sensor in a state that a gain is adjusted for a purge mode or common control mode, to compare with a flowing amount set by a user and to control the valve for thereby decreasing or increasing a gas flowing amount inputted from the outside.

To achieve the above objects, in a mass flow controller which is capable of accurately controlling and correctly various gases used for a fabrication of a semiconductor to flow by a desired amount, there is provided a method for managing a mass flow controller for a control purge which includes (1) a step for judging whether before a mass flow controller is used, a user sets a purge function mode in accordance with a purpose of use of a corresponding mass flow controller or sets a common mode, (2) a step for judging whether when a user sets a mass flow controller to a purge function mode as a result of a judgement, a user sets a control purge mode capable of controlling a maximum flowing amount for constantly maintaining a maximum flowing amount when a corresponding user performs a purge function or a user sets a valve open purge mode capable of implementing a maximum flowing amount by fully opening a valve, (3) a step for controlling a valve for constantly maintaining a maximum flowing amount by switching to a gain resistor for a purge mode having a gain value capable of performing a purge function and controlling a valve for accurately controlling a small flowing amount by switching to a gain resistor for a common control mode having a gain value capable of performing a common control function, by comparing a set value of a flowing amount inputted based on a user's selection in the control circuit with a previously set threshold value in the case that the mode is set to a control purge mode as a result of the judgement of the step (2), and (4) a step for controlling a valve for fully opening a valve for implementing a maximum flowing amount or for accurately controlling a small flowing amount, by comparing a set value of a flowing amount inputted based on a user's selection in the control circuit with a previously set threshold value in the case that the mode is set to a valve open purge mode as a result of the judgement of the step (2).

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The mass flow controller for a control purge according to the present invention will be described with reference to the accompanying drawings.

Figure 2:
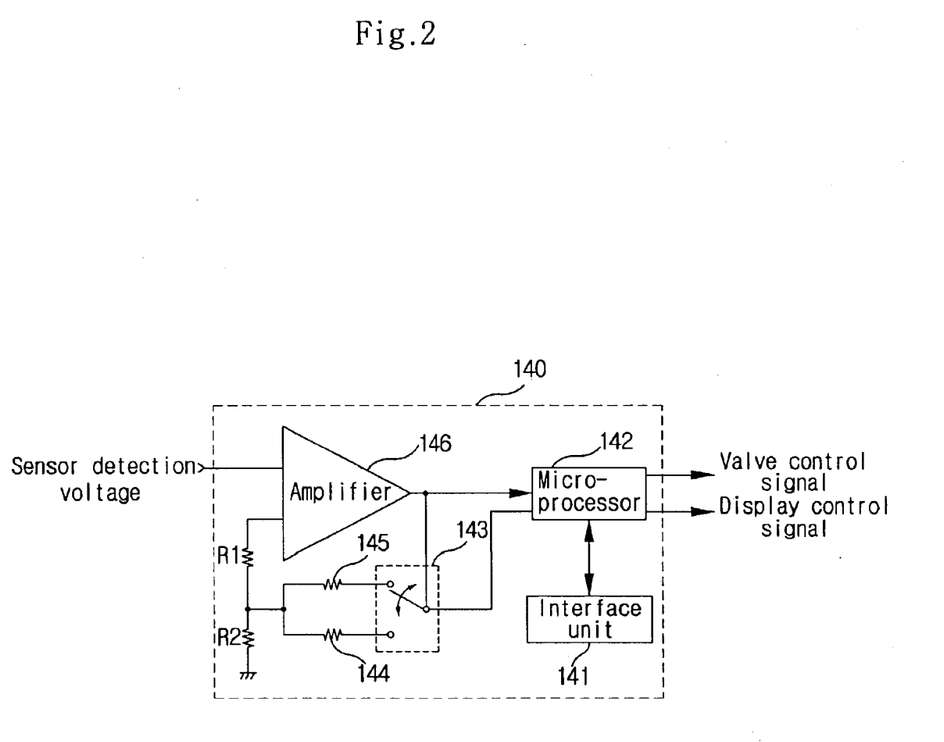
FIG. 2 is a view illustrating a schematic construction of a mass flow controller for a control purge according to the present invention.

FIG. 2 is a view illustrating a schematic construction of a mass flow controller for a control purge according to the present invention. Here, the reference numerals of FIG. 1 will be used without changing the same.

As shown therein, a sensor 110 is adapted to detect a temperature difference at both sides of a detection coil based on a flow of gas flowing through a tube and outputs the detected value to a control circuit 140.

The bypass 120 flows a part of gas inputted from the outside to the tube having the sensor 110 and divides the flow of gas.

The valve 130 adjusts the flowing amount of gas inputted through the bypass 120 in accordance with a control signal for an increase and decrease of the flowing amount of gas based on a gain adjustment for a common control or a gain adjustment for a purge outputted from the control circuit 140, so that an accurate amount of gas set by a user is outputted to the outside in a common control mode, and the maximum amount of gas is outputted to the outside in a purge mode.

The control circuit 140 switches to a resistor having a gain value for thereby performing a purge function by judging that the mode is for a purge when the set value of the flowing amount inputted by a user who uses the mass flow controller 100 in the purge function mode is set exceeds a previously set threshold value and switches to a resistor having a gain for performing a common control function by judging that the mode is for a common control when the set value of the flowing amount inputted by a user is below the threshold value.

In addition, the control circuit 140 computes the current mass flow(the unit of the mass flow is SCCM: Standard Cubic Centimeter per Minute) or the standard liter(the unit is SLM: Standard Liter per Minute) based on the value of a temperature difference by the flow of gas inputted from the sensor 110 in a state that a gain adjustment is performed for a purge or common control mode and compares with the flowing amount set by a user for thereby decreasing or increasing the flowing amount of the gas inputted from the outside and controlling the valve 130.

At this time, the purge function mode is one among the control purge mode in which the maximum flowing amount is controlled for constantly maintaining the maximum flowing amount when performing the purge mode and the valve purge mode in which the maximum flowing amount is implemented by fully opening the valve without controlling the maximum flowing amount. Here, the threshold value which is stored in the control circuit 140 and is compared with the set value of the flowing amount inputted by a user may be properly set based on the purpose of use of the mass flow controller 100(for example, the maximum flowing amount range(full scale) of the mass flow controller 100 may be set to 95%).

The control circuit 140 may be formed of an interface unit 141, a microprocessor 142, a switch 143, a purge gain resistor 144, a common control gain resistor 145, an amplifier 146 and resistors R1 and R2.

As shown therein, the interface unit 141 outputs the set value of the flowing amount inputted by a user to the microprocessor 142.

The microprocessor 142 outputs a control signal to the switch 143 for switching to the purge gain resistor 144 if the set value of the flowing amount inputted by a user is above a previously set threshold value by comparing the set value of the flowing amount inputted through the interface unit 141 with a previously set threshold value in a state that the purge function mode is set and outputs a controls signal to the switch 143 for switching to the common control gain resistor 145 when the set value of the flowing amount inputted by a user is below the previously set threshold value.

In addition, the microprocessor 142 computes the current mass flow based on the value of the temperature difference detected by the sensor 110 amplified and inputted from the amplifier 146 in a state that the mode is switched to the purge gain resistor 144 or the common control gain resistor 145, compares the current computed mass flow with the mass flow set by a user and outputs a control signal to the valve 130 for decreasing or increasing the flowing amount of gas inputted from the outside based on a result of the comparison.

The switch 143 switches the current mode to the purge gain resistor 144 or the common control gain resistor 145 which has the purge or common control gain value, respectively, in accordance with a switching control signal inputted from the microprocessor 142.

The purge gain resistor 144 is a resistor having a certain gain value for processing a large flowing amount (for example, 1000 sccm).

The common control gain resistor 145 is a resistor having a gain value capable of processing a small flowing amount (for example, from 5 sccm to 50 sccm).

The amplifier 146 amplifies the value of the temperature difference detected and inputted from the sensor 110 in accordance with a gain value of the purge gain resistor 144 or common control gain resistor 145 switched by the switch 143 and outputs to the microprocessor 142.

Next, an embodiment of the mass flow controller operation method for a control purge according to the present invention will be described with reference to FIGS. 3 through 5.

Figure 3:
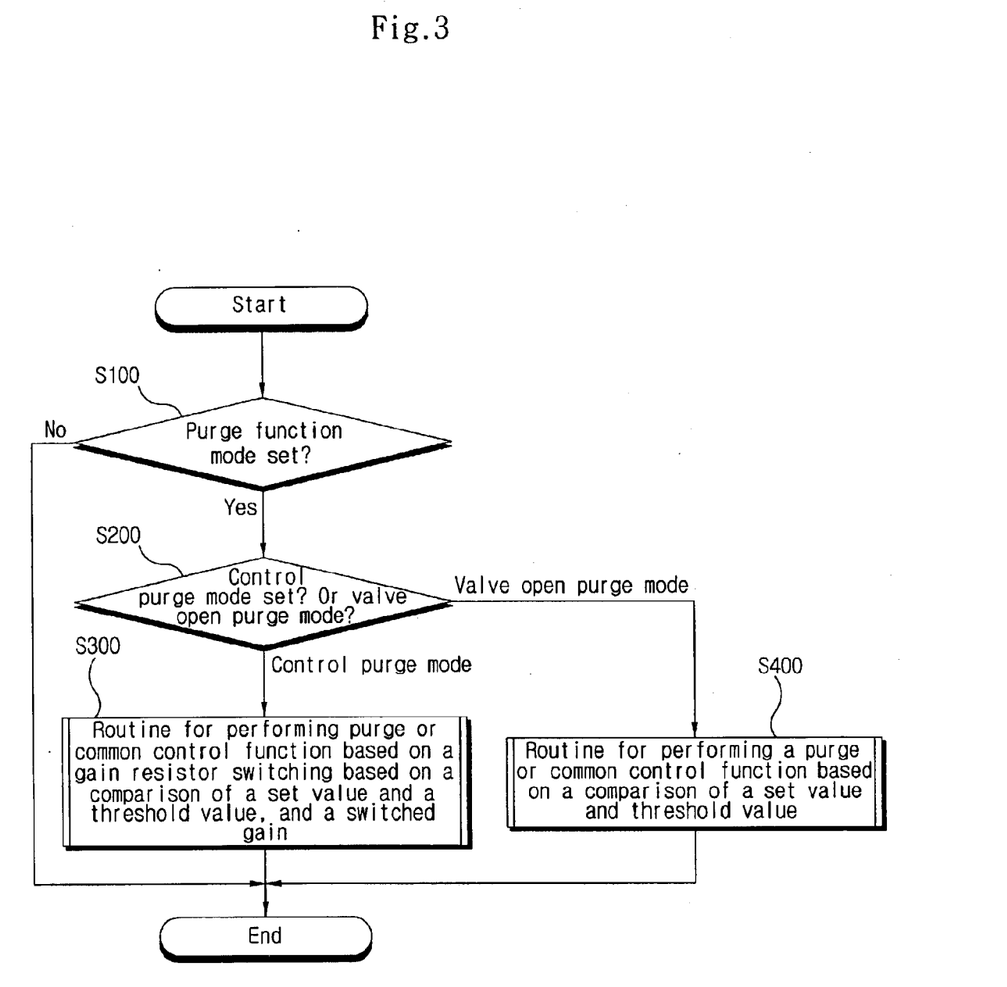
FIG. 3 is a flow chart of a managing method of a mass flow controller for a control purge according to the present invention.
Figure 4:
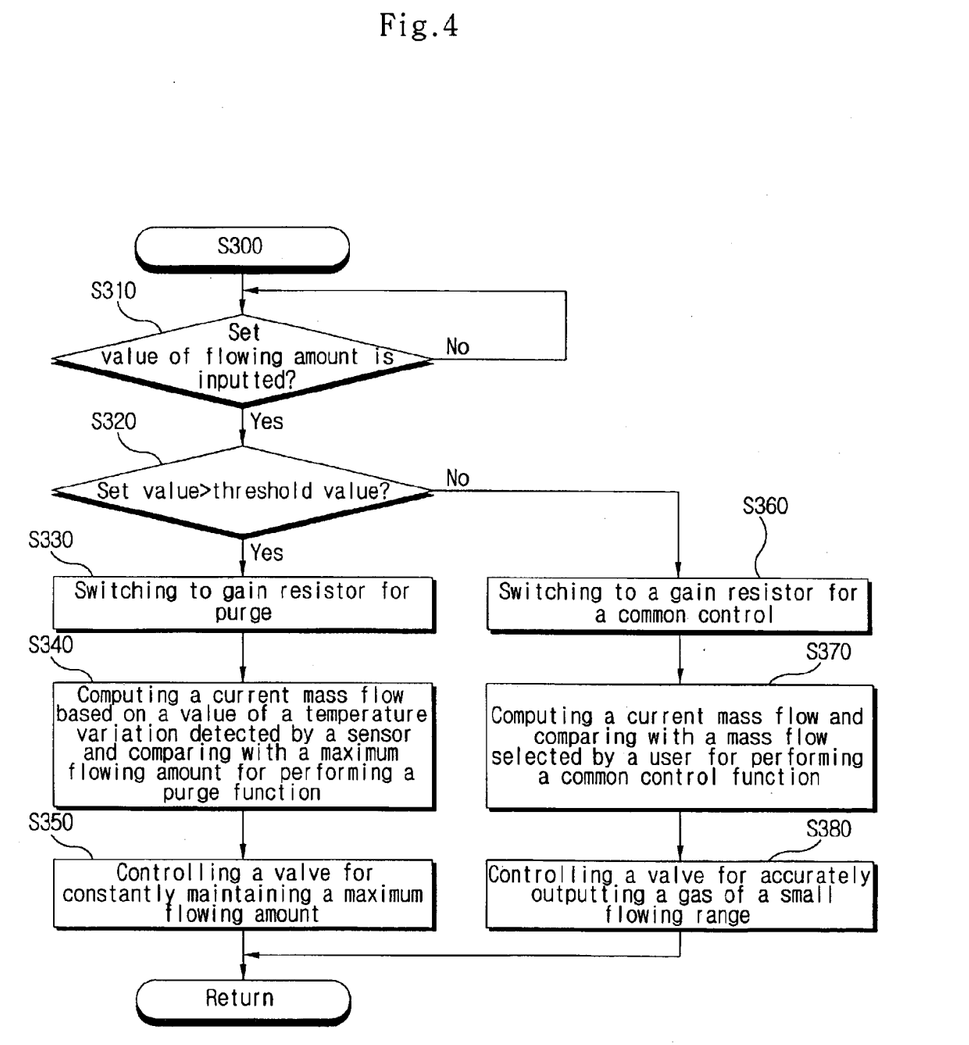
FIGS. 4 and 5 are flow charts of the constructions of each sub-routine of FIG. 3 according to the present invention.
Figure 5:
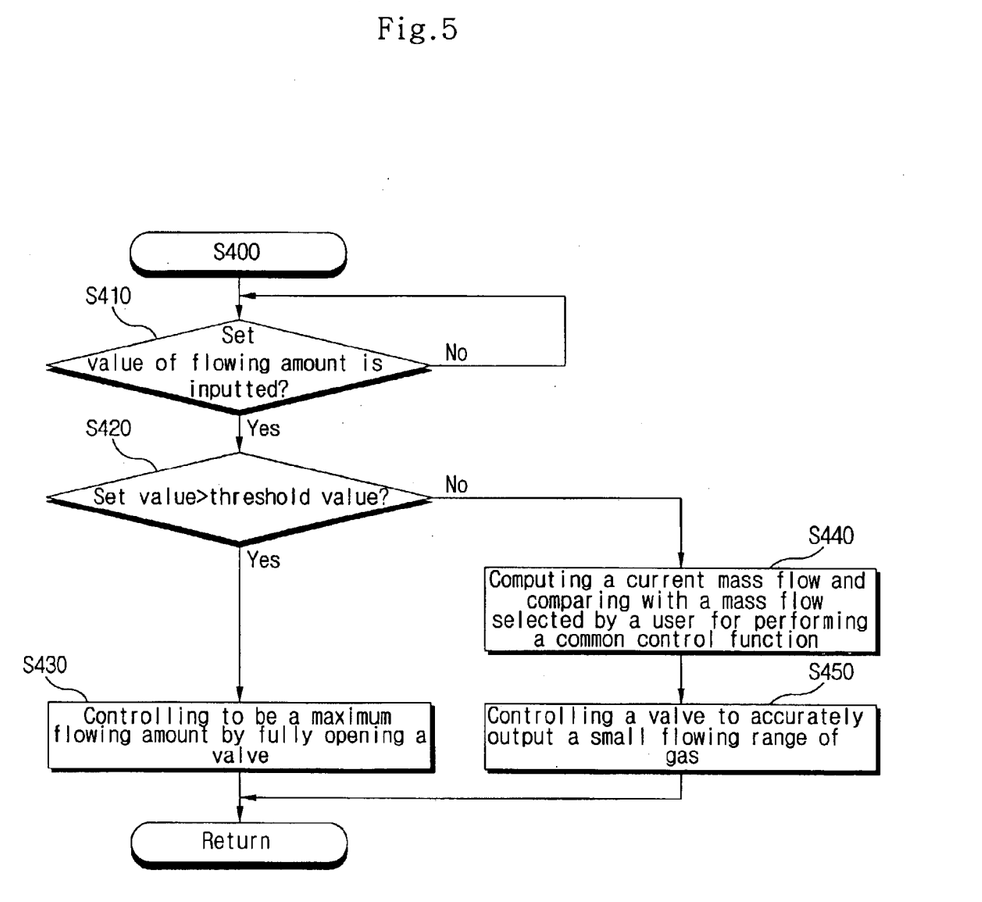

FIGS. 3 through 5 are flow charts of the mass flow controller operation method for a control purge according to the present invention.

First, before the mass flow controller 100 is used, it is judged that whether the user sets the purge function mode (the function for flowing a large amount of gas by opening the valve for the purpose of cleaning, etc.) or the common mode(the common function of the mass flow controller) based on the purpose of the use of a corresponding mass flow controller 100(S100).

As a result of the judgement, if the mass flow controller 100 is set to the purge function mode, it is judged whether the mode is set to the control purge mode for controlling the maximum flow of the valve 130 for constantly maintaining the maximum flow when a corresponding user performs the purge function, or is set to the valve open purge mode for the maximum flowing amount by fully opening the valve 130 (S200).

As a result of the judgement, in the case that the mode is the set to the control purge mode, the control circuit 140 compares the set value of the flowing amount inputted based on a selection of the user and a previously set threshold value and controls the valve 130 in such a manner that the valve 130 is controlled for constantly maintaining the maximum flowing amount by switching to the purge gain resistor 144 having a certain gain value for performing the purge function or controls the valve 130 in such a manner that the valve 130 accurately controls the small amount of the flowing gas by switching to the common control gain resistor 145 having a certain gain value for performing a common control function.

In detail, in a state that the mass flow controller 100 is set to the control purge mode, the microprocessor 142 of the control circuit 140 judges whether the set value of the flowing amount based on a user's selection is inputted through the interface unit 141(S310).

As a result of the judgement, if the set value of the flowing amount based on a user's selection is inputted, the microprocessor 142 of the control circuit 140 judged whether the set value inputted by the user is above a previously set threshold value(S320). Namely, it is judged whether the set value of the flowing amount inputted by a user is above a certain range(for example, 95% of the maximum flowing range of the mass flow controller 100) of the maximum flowing range which is the previously set threshold value.

As a result of the judgement, if the set value of the flowing amount inputted by a user is above a previously set threshold value, the microprocessor 142 outputs a control signal to the switch 143 for switching to the purge gain resistor 144 having a certain gain value for performing the purge function for thereby adjusting the gain value of the amplifier 146(S330).

Thereafter, the microprocessor 142 computes the current mass flowing amount based on the value of the temperature difference detected by the sensor 110 which is amplified and inputted from the amplifier 146 and compares the current computed mass flowing amount with the maximum flowing amount for performing the purge function(S340) and outputs a control signal to the valve 130 for decreasing and increasing the flowing amount of gas inputted from the outside as a result of the comparison for thereby constantly maintaining the maximum flowing amount(S350).

However, as a result of the judgement of the step S320, if the set value of the flowing amount inputted by the user is below the previously set threshold value, the microprocessor 142 outputs a control signal to the switch 143 for switching to the common control gain resistor 145 having a certain gain value for performing a common control function for thereby adjusting the gain value of the amplifier 146(S360).

Thereafter, the microprocessor 142 computes the current mss flowing amount based on the value of the temperature difference detected by the sensor 110 amplified and inputted through the amplifier 146 and compares the current computed mass flowing amount with the mass flowing amount inputted by a user for performing the common control function(S370) and outputs a control signal to the valve 130 for decreasing or increasing the flowing amount of gas inputted from the outside as a result of the comparison for thereby accurately outputting a gas of a small range of flowing amount(S380).

As a result of the judgement of the step S200, in the case that the valve open purge mode is set, the control circuit 140 compares the set value of the flowing amount inputted by a user with the previously set threshold value and controls the valve 130 for fully opening the valve 130 in order for the maximum flowing amount of gas to flow or controlling a small flowing amount of gas accurately(S400).

In detail, in a state that the mass flow controller 100 is set to the valve open purge mode, the microprocessor 142 of the control circuit 140 judges whether a set value of the flowing amount based on the user's selection is inputted through the interface 141(S410).

As a result of the judgement, if the set value of the flowing amount based on the user's selection is inputted, the microprocessor 142 of the control circuit 140 judges whether the set value of the flowing amount inputted by the user is above a previously set threshold value(S420). Namely, it is judged whether the set value of the flowing amount inputted by the user is above a certain range of the maximum flowing range which is the previously set threshold value(for example, 95% of the maximum flowing amount range of the mass flow controller 100).

As a result of the judgement, if the set value of the flowing amount inputted by a user is above the previously set threshold value, the microprocessor 142 outputs a control signal to the valve 130 for fully opening the valve 130 for performing a purge function for thereby implementing the maximum flowing amount(S430).

However, as a result of the judgement of the step S420, if the set value of the flowing amount inputted by a user is below the previously set threshold value, the microprocessor 142 computes the current mass flowing amount based on the value of the temperature difference detected by the sensor 110 amplified and inputted through the amplifier 146 and compares the current computed mass flowing amount with the mass flowing amount inputted by the user for performing a common control function(S440). As a result of the comparison, a control signal is outputted to the valve 130 for decreasing or increasing the flowing amount of gas inputted from the outside as a result of the comparison for thereby accurately outputting a small flowing amount of gas(S450).

As described above, in the mass flow controller for a control purge and a managing method of the same according to the present invention, a common accurate control function and a purge function are concurrently implemented using one mass flow controller. Therefore, in the present invention, it is possible to overcome the problems of the conventional art in which a mass flow controller for a common control and a mass flow controller for a purge function are separately used. Therefore, it is possible to easily construct a desired equipment and a fabrication cost is significantly decreased.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a mass flow controller which is capable of accurately controlling and correctly adjusting the flowing amounts of various gases used for a fabrication of a semiconductor to flow by a desired amount, a mass flow controller for a control purge, comprising:

a sensor which is adapted to detect a temperature variation at both sides of a detection coil based on a flow of a gas flowing through a tube and to output a value of a temperature difference to a control circuit;

a bypass which is adapted to flow a part of gas inputted from the outside to a tube in which a sensor is installed and to divide and output a flow of gas; a valve which is adapted to adjust and output a flowing amount of gas inputted through the bypass based on a gain adjustment for a common control or a gain adjustment for a purge function of the control circuit; and a control circuit which is adapted to switch to a resistor having a gain value capable of performing a purge function by judging that the mode corresponds to a purge mode when a set value of a flowing amount inputted by a user who uses a mass flow controller in a state that a purge function mode is set, and to switch to a resistor having a gain value capable of performing a common control function by judging the mode corresponds to a common control mode when a set value of a flowing amount inputted by a user is below a threshold value, and to compute the current mass flowing amount based on a value of a temperature difference based on a gas flow inputted from the sensor in a state that a gain is adjusted for a purge mode or common control mode, to compare with a flowing amount set by a user and to control the valve for thereby decreasing or increasing a gas flowing amount inputted from the outside.

2. The controller of claim 1, wherein said control circuit includes:

an interface unit which is adapted to output a set value of a flowing amount inputted by a user to a microprocessor;

said microprocessor being adapted to output a control signal to a switch for switching to a gain resistor for a purge gain when a set value of a flowing amount inputted by a user is above a previously set threshold value by comparing a set value with a previously set threshold value when a set value of a flowing amount is inputted through the interface unit in a state that a purge function mode is set, to output a control signal to a switch for switching to a gain resistor for a common control when a set value of a flowing amount inputted by a user is below a previously set threshold value, to compute a current mass flow based on a value of a temperature difference detected by the sensor when amplified and inputted from an amplifier in a state that it is switched to a gain resistor for a purge mode or a common control mode, to compare the current computed mass flow with a mass flow set by a user and to output a valve control signal to the valve for decreasing or increasing a flowing amount of gas inputted from the outside based on a result of the comparison;

a switch which is adapted to switch to a gain resistor for a purge mode or a gain resistor for a common control mode having a purge or common control gain value, respectively, in accordance with a switching control signal inputted from the microprocessor; and an amplifier which is adapted to amplify a value of a temperature difference detected and inputted from the sensor based on a gain value of a gain resistor for a purge mode or a gain resistor for a common control mode switched by the switch and to output to the microprocessor.

3. The controller of claim 2, wherein a threshold value which is stored in the control circuit and is compared with a set value of a flowing amount inputted by a user is properly set based on a purpose of use.

4. The controller of claim 1, wherein said purge function mode is set to one of a control purge mode for controlling a maximum flowing amount for constantly maintaining a maximum flowing amount when performing a purge function and a valve open purge mode for implementing a maximum flowing amount by fully opening a valve without controlling a maximum flowing amount.

5. The controller of either claim 1 or claim 2, wherein a threshold value which is stored in the control circuit and is compared with a set value of a flowing amount inputted by a user is properly set based on a purpose of use.

6. In a mass flow controller which is capable of accurately controlling and correctly adjusting the flowing amounts of various gases used for a fabrication of a semiconductor to flow by a desired amount, a method for managing a mass flow controller for a control purge, comprising:

(1) a step for judging whether before a mass flow controller is used, a user sets a purge function mode in accordance with a purpose of use of a corresponding mass flow controller or sets a common mode;

(2) a step for judging whether when a user sets a mass flow controller to a purge function mode as a result of a judgement, a user sets a control purge mode capable of controlling a maximum flowing amount for constantly maintaining a maximum flowing amount when a corresponding user performs a purge function or a user sets a valve open purge mode capable of implementing a maximum flowing amount by fully opening a valve;

(3) a step for controlling a valve for constantly maintaining a maximum flowing amount by switching to a gain resistor for a purge mode having a gain value capable of performing a purge function and controlling a valve for accurately controlling a small flowing amount by switching to a gain resistor for a common control mode having a gain value capable of performing a common control function, by comparing a set value of a flowing amount inputted based on a user's selection in the control circuit with a previously set threshold value in the case that the mode is set to a control purge mode as a result of the judgement of the step (2); and (4) a step for controlling a valve for fully opening a valve for implementing a maximum flowing amount or for accurately controlling a small flowing amount, by comparing a set value of a flowing amount inputted based on a user's selection in the control circuit with a previously set threshold value in the case that the mode is set to a valve open purge mode as a result of the judgement of the step (2).

7. The method of claim 6, wherein said step (3) includes the sub-steps of:

(3-1) a step in which a microprocessor of a control circuit judges whether a set value of a flowing amount based on a user's selection is inputted through an interface unit in a state that the mass flow controller is set to a control purge mode;

(3-2) a step in which the microprocessor of the control circuit judges whether a set value of a flowing amount inputted by a user is above a previously set threshold value;

(3-3) a step in which when a set value of a flowing amount inputted by a user is above a previously set threshold value as a result of the judgement, the microprocessor adjusts a gain value of an amplifier by outputting a control signal to the switch for switching to a gain resistor for a purge mode having a gain value capable of performing a purge function;

(3-4) a step in which the microprocessor computes a current mass flow based on a value of a temperature difference detected by the sensor and amplified and inputted through an amplifier and compares the current computed mass flowing amount with a maximum flowing amount for performing a purge function;

(3-5) a step in which the microprocessor outputs a control signal to the valve for decreasing or increasing the flowing amount of gas inputted from the outside for thereby constantly maintaining a maximum flowing amount;

(3-6) a step in which when a set value of a flowing amount inputted by a user is below a previously set threshold value as a result of the judgement of the step (3-2), the microprocessor outputs a control signal to the switch for switching to a gain resistor for a common control having a gain value capable of performing a common control function for thereby adjusting a gain value of the amplifier;

(3-7) a step in which the microprocessor computes a current mass flow based on a value of a temperature difference amplified by an amplifier and detected by a sensor and compares the current computed mass flowing amount with a mass flowing amount inputted by a user for performing a common control function; and (3-8) a step in which the microprocessor outputs a control signal to the valve for decreasing or increasing the flowing amount of gas inputted from the outside as a result of the comparison for thereby outputting an accurate amount of gas in a small amount flowing amount range.

8. The method of the claim 7, wherein a threshold value which is stored in the control circuit and is compared with a set value of a flowing amount inputted by a user is properly set based on a purpose of use, region outside and close to an outer envelope of the plurality of slits on a lower surface of the substrate layer.

9. The method of claim 6, wherein said step(4) includes the sub-steps of:

(4-1) a step in which in a state that a mass flow controller is set to a valve open purge mode, the microprocessor of the control circuit judges whether a set value of a flowing amount based on a user's selection is inputted through an interface unit;

(4-2) a step in which the microprocessor of the control circuit judges whether a set value of a flowing amount inputted by a user is above a previously set threshold value;

(4-3) a step in which when a set value of the flowing amount inputted by a user is above a previously set threshold value as a result of the judgement, the microprocessor outputs a control signal to the valve for fully opening the valve for performing a purge function for thereby implementing a maximum flowing amount;

(4-4) a step in which when a set value of a flowing amount inputted by a user is below a previously set threshold value as a result of the judgement of the step(4-2), the microprocessor computes a current mass flowing amount based on a value which is amplified by an amplifier and detected by a sensor and compares the current computed mass flowing amount with a mass flowing amount inputted by a user for performing a common control function; and (4-5) a step in which the microprocessor outputs a control signal to the valve for decreasing or increasing a flowing amount of gas inputted from the outside and accurately outputs a gas of a small flowing amount of gas.

10. The method of claim 9, wherein a threshold value which as stored in the control circuit and is compared with a set value of a flowing amount inputted by a user is properly set based on a purpose of use, region outside and close to an outer envelope of the plurality of slits on a lower surface of the substrate layer.

11. The method of one selected from claims 6 through 9, wherein a threshold value which is stored in the control circuit and is compared with a set value of a flowing amount inputted by a user is properly set based on a purpose of use.

* * * * *